United States Patent
Kim et al.

[11] Patent Number: 6,096,672
[45] Date of Patent: Aug. 1, 2000

[54] MICROWAVE DIELECTRIC CERAMIC COMPOSITION

[75] Inventors: Ho Gi Kim; Yung Park, both of Seoul, Rep. of Korea

[73] Assignee: Korea Advanced Institute of Science and Technology, Taejeon, Rep. of Korea

[21] Appl. No.: 09/133,732

[22] Filed: Aug. 13, 1998

[30] Foreign Application Priority Data

Sep. 11, 1997 [KR] Rep. of Korea ................... 97-46861

[51] Int. Cl.$^7$ .................................. L04B 35/486
[52] U.S. Cl. ........................................ 501/135
[58] Field of Search ................... 501/134, 135

[56] References Cited

U.S. PATENT DOCUMENTS 5,164,882  11/1992  Kanai et al. .
5,219,809   6/1993  Kato et al. .

OTHER PUBLICATIONS

S. Hirano et al., "Chemical Processing and Microwave Characteristics of (Zr,Sn) TiO$_4$ Microwave Dielectrics," *Jpn. Am.Ceram. Soc.,* vol. 74[6], pp. 1320–1324 (1991) no month.

J. Kato et al., "Crystal Structure Refinement of (Pb$_{1-x}$Ca$_x$)ZrO$_3$ by the Rietvelt Method," *Jpn J. Appl. Phys.,* vol. 32, Sep. (1993), pp. 4356–4359.

J. Kato et al., "Dielectric Properties of Lead Alkaline–Earth Zirconate at Microwave Frequencies," *Japanese Journal of Applied Physics,* vol. 30, No. 9B, Sep., 1991, pp. 2343–2346.

*Primary Examiner*—Karl Group
*Attorney, Agent, or Firm*—Hickman Stephens Coleman & Hughes, LLP

[57] ABSTRACT

A microwave dielectric composition, comprising a basic composition, represented by the following formula:

$$(Pb(1-x)Ca(x))(Zr(1-y)Sn(y))O(3)$$

wherein x and y are molar ratios in the relation of $0.15 < x < 0.40$ and $0.15 < y < 0.50$, and a sintering aid represented by the following formula:

$$a\ ZnO + b\ Sb_2O_3$$

wherein a and b are percentages relative to the total weight of the basic composition, in the relation of $0 < a+b < 0.05$ weight %. The composition can be sintered at relatively low temperature and are superior in dielectric constant and quality factor. The low-temperature sintering yields the effects of allowing the sinters to have a fine structure and be of high long-term reliability, including high-temperature resistance and humidity resistance.

2 Claims, No Drawings

MICROWAVE DIELECTRIC CERAMIC COMPOSITION

BACKGROUND OF THE INVENTION

Field of the invention

The present invention relates to a microwave dielectric ceramic composition. More particularly, the present invention relates to an economically favorable microwave dielectric ceramic composition superior in long-term reliability, such as high-temperature resistance and humidity resistance.

Description of the Prior Art

U.S. Pat. Nos. 5,219,809 and 5,164,882 suggest dielectric compositions, both similar in main composition and sintering aid, which are useful materials for components of, e.g. communication equipment, disclosing that the applicapability and productivity of the components are generally improved as their dielectric constants decrease and the sintering temperatures decrease.

Kato et al. reported in Jpn. J. Appl. Phsy. 30(9B) 2343 (1991) and 32(9B) 4356(1993) a dielectric ceramic composition with high dielectric constant, consisting mainly of lead oxide (PbO), calcium oxide (CaO) and zirconium oxide ($ZrO_2$), which was developed by an oxide combining technique. According to J. Am. Ceram. Soc., 74[6] 1320–1324 (1991) of Shinitchihirano et al., Zr(0.8)Sn(0.2)TiO(4) composition has a dielectric constant of about 40, a quality factor of over 5,000 and a temperature coefficient of resonant frequency of below 20 ppm/° C. However, this composition is difficult to prepare as it requires pulverization to fine particles of 0.3 μm through alkoxide technique and high temperature sintering of about 1,600° C. but shows a relative low dielectric constant.

The above microwave dielectric ceramic compositions show dielectric constant and quality factor enough to be used as a material for dielectric resonators, but because the sintered dielectric material is not of fine structure, if the dielectric resonators are used for a long time at a high temperature and humidity region, they become poor in quality factor and unstable in the temperature coefficient of resonant frequency and thus, the filter characteristic is lowered.

SUMMARY OF THE INVENTION

The intensive and thorough research repeated by the present inventors resulted in the finding that the low filter characteristic attributed mainly to poor quality factor and unstable temperature coefficient can be overcome by a low temperature-sintering technique which allows a fine structure to be introduced into a dielectric material and that a Pb(1−x)Ca(x)Zr(1−y)Sn(y)O(3)-based composition in combination with a trace amount of a sintering aid mixture of ZnO and $Sb_2O_3$ can be sintered at relatively low temperatures.

It is, therefore, an object of the present invention to overcome the above problems encountered in prior arts and to provide a microwave dielectric ceramic composition much improved in both high temperature-resistant and humidity-resistant characteristics.

It is another object of the present invention to provide a dielectric ceramic composition, which can be sintered at such a low temperature as to produce an economical favor.

In accordance with the present invention, the above objects could be accomplished by a provision of a microwave dielectric ceramic composition comprising a basic composition of lead oxide (PbO), calcium carbonate ($CaCO_3$), zirconium oxide ($ZrO_2$) and stannic oxide ($SnO_2$), in combination with a mixture of zinc oxide (ZnO) and antimony anhydride ($Sb_2O_3$) as a sintering aid.

DETAILED DESCRIPTION OF THE INVENTION

Oxides of lead, zirconium and tin and a carbonate of calcium have been used as materials for dielectric compositions. However, the compositions consisting of these elements only should be sintered at relatively high temperatures to produce dielectrics which can be incorporated in such a device as a dielectric resonator or a capacitor.

The present inventors have made extensive studies on a useful dielectric, particularly, obtainable by sintering at low temperatures and found a mix of zinc oxide and antimony anhydride can make a great contribution to reduction of the sintering temperature of the compositions consisting of oxide of lead, zirconium and tin and a carbonate of calcium. Therefore, the present invention pertains to a dielectric ceramic composition comprising a basic mixture of lead oxide, calcium carbonate, zirconium oxide and stannic oxide, added with zinc oxide and antimony anhydride.

In an embodiment of the present invention, there is provided a dielectric, ceramic composition, comprising a basic composition, represented by the following formula:

$$(Pb(1-x)Ca(x))(Zr(1-y)Sn(y))O(3)$$

wherein x and y are molar ratios in the relation of 0.15<x<0.40 and 0.15<y<0.50, and a sintering aid represented by the following formula:

$$a\ ZnO + b\ Sb_2O_3$$

wherein a and b are percentages relative to the total weight of the basic composition, in the relation of 0<a+b<0.05 weight %.

The following is the reason why the composition range of the dielectric, ceramic composition of the present invention is limited as defined above.

If x is below 0.15, the product of quality factor and resonant frequency is very low. On the other hand, if x is over 0.40, the product of quality factor and temperature coefficient of resonant frequency increases but the dielectric constant decreases. For the y, a value smaller than 0.15 makes the temperature coefficient of resonant frequency the same as or greater than −10 ppm/° C. while, if greater than 0.5, the temperature coefficient of resonant frequency leaps to +10 ppm/° C.

As a sintering aid, the mixture of zinc oxide and antimony anhydride makes the sintering temperature of the composition low. The basic composition alone is not sintered without an increase in the temperature to at least 1,450° C. The high sintering temperature results in a coarse structure of the sintered body. On the other hand, if the sintering aid is added at an amount greater than 0.05% by weight, the sintering temperature can be decreased but the quality factor falls down. Therefore, it is preferable in the aspects of a sintering temperature and a sintered structure that the sintering aid of the present invention is added at an amount between 0 and 0.05% by weight.

The basic composition in combination with zinc oxide and antimony anhydride, can be sintered at a relatively low temperature ranging from 1,300 to 1,400° C. Thus, it is economically favorable.

As described above, the addition of the sintering aid of the present invention makes it possible that the composition comprising lead oxide, calcium carbonate, zirconium oxide and stannic oxide is sintered to a fine structure, so that the dielectric components from the composition are superior in long-term reliabilities, such as high temperature resistance and humidity-resistance characteristics. In fact, the sinters of the compositions according to the present invention were found to show a dielectric constant of 110 or higher and a quality factor of 4,000 or higher in addition to being stable in quality factor and temperature coefficient of resonant frequency.

A better understanding of the present invention may be obtained in light of the following examples which are set forth to illustrate, but are not to be construed to limit, the present invention.

EXAMPLES I TO IX

Highly pure powders of lead oxide (PbO), calcium carbonate ($CaCO_3$), stannic oxide ($SnO_2$), and zirconium oxide ($ZrO_2$) as the starting materials were blended in combination with a sintering mix of zinc oxide (ZnO) and antimony anhydride ($Sb_2O_3$), so as to obtain composition ratios shown in Table 1 below, and mixed by a planetary mill using a zirconia ball and a nylon jar. Distilled water was used as a dispersing medium and the sufficiently mixed slurries were dried, calcined at 1,100 to 1,200° C. depending on their compositions and pulverized into appropriate particle sizes. The resultant powders were molded under a pressure of 1 ton/$cm^2$ in a dry press to form disks each having a diameter of 10.0 mm and a thickness of 4.554 mm. These disks were sintered at a temperature of 1,300–1,400° C. and their both sides were polished flat. The samples thus obtained had a base composition consisting of Pb(1−x)Ca(x)Zr(1−y)Sn(y)O(3) in combination with a sintering aid mix of ZnO and $Sb_2O_3$, in which the sintering aid mix was added on the basis of 100 weight % of the base composition, as listed in the table.

The samples were tested for reliability according to the RS 198 specification of EIA (Electronic Industries Association) under the following conditions: quality factor (Q) and temperature coefficient of resonant frequency (τf) were measured after the samples were used at a temperature of 85±5° C., a voltage of 100 V, a current of 50 mA for 1,000 hours for high-temperature resistance test, and at a temperature of 40±5° C., a humidity of 90–95, a voltage of 50 V, and a current of 50 mA for 500 hours for humidity resistance test. Dielectric constant and dielectric loss were measured according to the Hakki Coleman method. The results of the tests are given as shown in Table 1 below.

COMPARATIVE EXAMPLES X AND XI

Using composition ratios as indicated in Table 1, samples were prepared in the same manner with that of Examples I–IX, except that the sintering aid mix was not added. The reliability test was also performed for the samples and the results are given as shown in Table 1.

COMPARATIVE EXAMPLES XII AND XIII

Using composition ratios as indicated in Table 1, samples were prepared in the same manner with that of Examples I–IX, and the results of the reliability test are given as shown in Table 1.

TABLE 1

| | Compositions and Properties | | | | | | | | | | | |
|---|---|---|---|---|---|---|---|---|---|---|---|---|
| | Basic comp. $Pb_{1-x}Ca_x$ | | Sintering Aid (wt %) | | Sinter | Diele. | Qual. Factor | Temp. Coeff. of | Humid. Resist. | | High Temp. Resist. | |
| Exp. Nos. | $Zr_{1-y}$ x | $Sn_yO_3$ y | ZnO a | $Sb_2O_3$ b | Temp. (°C.) | Const. (5 GHz) | (5 GHz) (Q) | Resonant freq. (τf) | Q | τf | Q | τf |
| I | 0.34 | 0.28 | 0.01 | 0.02 | 1,310 | 110 | 2,200 | 2.4 | 2120 | 2.3 | 2100 | 2.4 |
| II | 0.33 | 0.26 | 0.01 | 0.03 | 1,320 | 113 | 2,100 | 2.4 | 2000 | 2.5 | 2000 | 2.5 |
| III | 0.31 | 0.33 | 0.03 | 0.01 | 1,310 | 118 | 2,300 | −1.5 | 2200 | −1.8 | 2200 | −1.4 |
| IV | 0.26 | 0.40 | 0.03 | 0.01 | 1,290 | 124 | 3,050 | 0.5 | 3020 | 1.0 | 2980 | 0.6 |
| V | 0.32 | 0.32 | 0.02 | 0.02 | 1,340 | 120 | 2,870 | 2.1 | 2500 | 2.5 | 2860 | 2.2 |
| VI | 0.23 | 0.40 | 0.02 | 0.02 | 1,280 | 118 | 3,150 | −1.4 | 3100 | −1.0 | 3020 | −1.7 |
| VII | 0.33 | 0.24 | 0.02 | 0.01 | 1,330 | 117 | 2,760 | 1.2 | 2600 | 1.7 | 2640 | 1.4 |
| VIII | 0.22 | 0.40 | 0.02 | 0.03 | 1,420 | 121 | 2,540 | 0.7 | 2400 | 1.3 | 2490 | 0.9 |
| IX | 0.35 | 0.21 | 0.01 | 0.01 | 1,380 | 127 | 2,400 | −0.3 | 2310 | −1.0 | 2310 | −0.5 |
| X | 0.10 | 0.10 | — | — | 1,300 | | sintering impossible | | | | | |
| XI | 0.20 | 0.30 | — | — | 1,320 | 120 | 1,900 | 4.0 | 1000 | 7.0 | 1500 | 15.0 |
| XII | 0.30 | 0.57 | 0.04 | 0.04 | 1,100 | 80 | 1,230 | 20.0 | 1000 | 60.0 | 1000 | 28.0 |
| XIII | 0.51 | 0.33 | 0.01 | 0.01 | 1,430 | 70 | 1,560 | 75.0 | 980 | 150. | 1230 | 100 |

Taken together, the data of Table 1 demonstrated that the dielectric, ceramic compositions of the present invention, comprising a basic composition consisting of lead oxide (PbO), calcium carbonate ($CaCO_3$), zirconium oxide ($ZrO_2$) and stannic oxide ($SnO_2$), in combination with a mixture of zinc oxide (ZnO) and antimony anhydride ($Sb_2O_3$) as a sintering aid, can be sintered at relatively low temperature and are superior in dielectric constant and quality factor. Also, the low-temperature sintering yields the effects of allowing the sinters to have a fine structure and be of high long-term reliability, including high-temperature resistance and humidity resistance.

Other features, advantages and embodiments of the invention disclosed herein will be readily apparent to those exercising ordinary skill after reading the foregoing disclosures. In this regard, while specific embodiments of the invention have been described in considerable detail, variations and modifications of these embodiments can be effected without departing from the spirit and scope of the invention as described and claimed.

What is claimed is:

1. A microwave dielectric composition, comprising a basic composition consisting of lead oxide, calcium oxide, zirconium oxide and stannic oxide, in combination with a sintering aid mix of zinc oxide and antimony anhydride.

2. A microwave dielectric composition in accordance with claim 1, wherein said composition comprises a basic composition, represented by the following formula:

$$(Pb(1-x)Ca(x))(Zr(1-y)Sn(y))O(3)$$

wherein x and y are molar ratios in the relation of $0.15<x<0.40$ and $0.15<y<0.50$, and a sintering aid represented by the following formula:

$$a\ ZnO + b\ Sb_2O_3$$

wherein a and b are percentages relative to the total weight of the basic composition, in the relation of $0<a+b<0.05$ weight %.

* * * * *